United States Patent [19]

Takakuwa et al.

[11] 4,445,479

[45] May 1, 1984

[54] IGNITION TIMING CONTROL APPARATUS WITH KNOCK SENSOR

[75] Inventors: Eiji Takakuwa, Okazaki; Kazumi Nakano; Izumi Kizitani, both of Kariya, all of Japan

[73] Assignee: Nippondenso Co., Ltd., Kariya, Japan

[21] Appl. No.: 398,273

[22] Filed: Jul. 14, 1982

[30] Foreign Application Priority Data

Jul. 17, 1981 [JP] Japan ................ 56-111593

[51] Int. Cl.³ .............................................. F02P 5/14
[52] U.S. Cl. ...................................... 123/425; 123/422
[58] Field of Search .................. 123/425, 422, 419

[56] References Cited

U.S. PATENT DOCUMENTS

| | | | |
|---|---|---|---|
| 4,116,173 | 9/1978 | McDougal et al. | 123/425 |
| 4,282,841 | 8/1981 | Takagi et al. | 123/425 |
| 4,357,918 | 11/1982 | Asano | 123/425 |
| 4,366,792 | 1/1983 | Deleris | 123/425 |
| 4,376,429 | 3/1983 | Youngblood | 123/425 |

FOREIGN PATENT DOCUMENTS 2030644 4/1980 United Kingdom ................ 123/425

Primary Examiner—Andrew M. Dolinar
Attorney, Agent, or Firm—Cushman, Darby & Cushman

[57] ABSTRACT

In an ignition timing control apparatus for controlling the ignition timing of each cylinder in order to reduce knock generation in a multi-cylinder engine, a lag-angle correction is made for the ignition timing of a cylinder in which a knock is generated and at the same time, a slight lag-angle correction is made for the ignition timing of the other cylinders in which no knock is generated. When the operating condition of engine is rapidly changed for example, under the condition in which knock is liable to occur in all cylinders as at rapid acceleration time, a lag-angle correction is made by the same amount as in the knock generating cylinder, for the ignition timing of cylinders in which no knock is generated. When no knock is generated for a predetermined time, a lead-angle correction is made for the ignition timing subjected to the lag-angle correction of each cylinder at intervals of the predetermined time.

5 Claims, 8 Drawing Figures

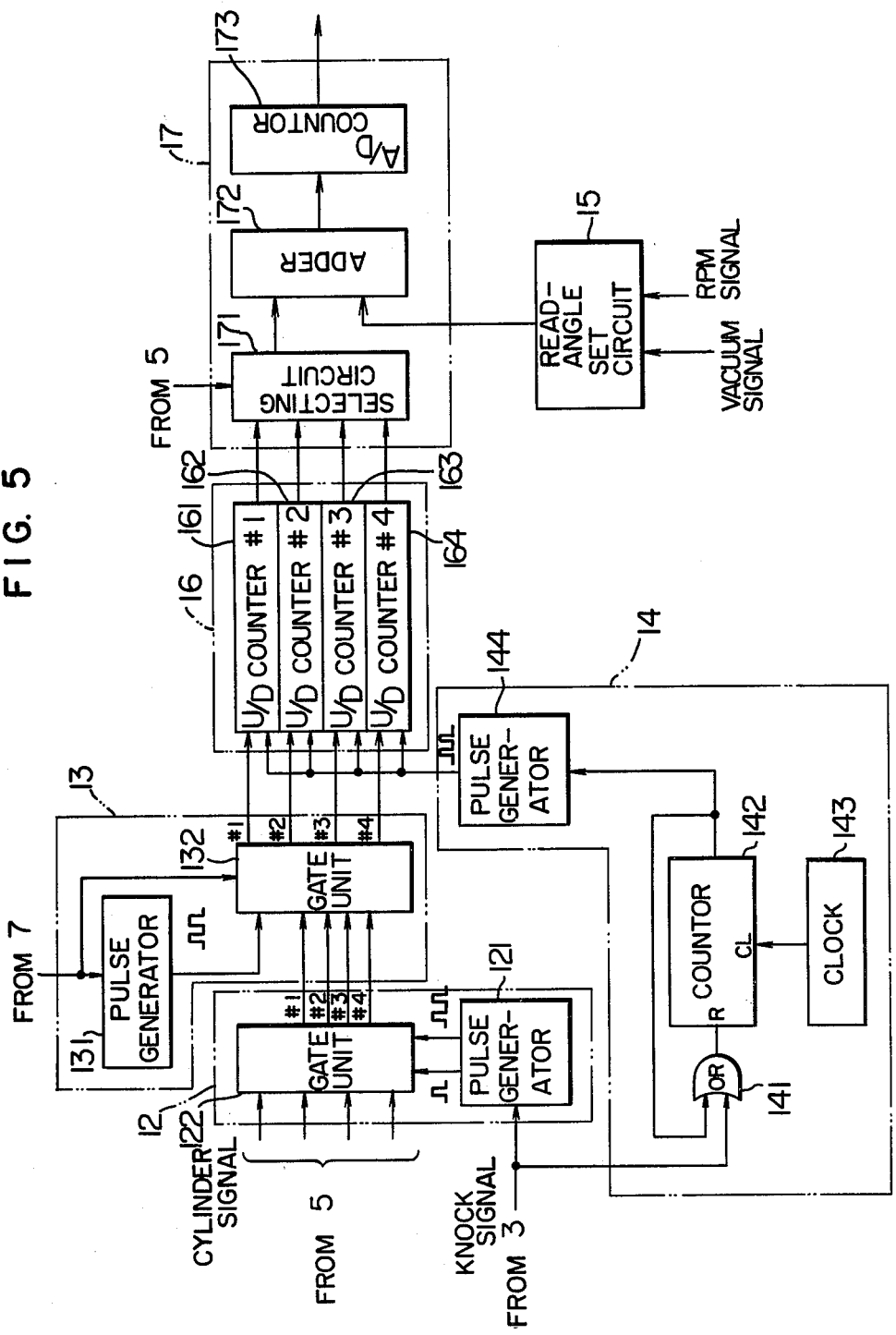

LAPSE TIME

IGNITION TIMING CONTROL APPARATUS WITH KNOCK SENSOR

BACKGROUND OF THE INVENTION

This invention relates to an ignition timing control apparatus for reducing the knocking generation of an engine, and particularly to an ignition timing control apparatus for controlling the ignition timing of each cylinder in order to reduce the knocking generation in a multi-cylinder engine.

For properly suppressing the generation of knocking (hereinafter, simply referred to as knock), there has been proposed a knock feedback system for example, in U.S. Pat. Nos. 4,120,272; 4,153,020; and 4,269,155 to keep optimum output of the engine with low fuel cost. The knock sensor used in this system is an acceleration sensor for detecting the knock vibration of the engine. As a method of suppressing the generation of knock by controlling the ignition timing upon knock generation, there has been proposed a system of independently controlling the ignition timing of each cylinder.

In the knock feedback system disclosed in the U.S. Patents mentioned above, since knock is detected from the vibration of the engine, the precision of knock detection is different at each cylinder and therefore knock detection for every cylinder cannot be made. Accordingly, the engine cannot be operated in order to achieve the optimum output at each cylinder. In the knock suppressing method of independently controlling ignition timing of each cylinder, there is a drawback that for example, in an 8 cylinder engine at least 8-time knock sound is generated in each of 8 cylinders because of the independent control, thus knock sound being very frequently caused.

SUMMARY OF THE INVENTION

It is an object of the invention to provide an ignition timing control apparatus in which the knock generation frequency is reduced with the drawbacks of the prior art obviated, and the ignition timing of each cylinder is corrected in order that the optimum output can be obtained in each cylinder.

In accordance with this invention, a lag-angle correction is made for the ignition timing of a cylinder in which a knock is generated (referred to as knock cylinder) in order to reduce the knock generation frequency, and at the same time the other cylinders in this engine are treated to be in the condition in which knock is liable to occur at this particular knock generation time, so that a slight lag-angle correction is made for the ignition timing of the other cylinders (referred to as non-knock cylinders) in which no knock is generated, by calculating the lag-angle correction amounts different for the knock cylinder and non-knock cylinder. Moreover, when the operating condition is rapidly changed, or for example, when all cylinders are liable to generate knock as at rapid acceleration time, a lag-angle correction is made by the same amount as in the knock cylinder, to the ignition timing of the non-knock cylinder.

Therefore, knock generation frequency in the whole engine can be reduced, and also since each cylinder can be set to an ignition timing corresponding to different knock limit, the optimum output of the engine can be obtained.

BRIEF DESCRIPTION OF THE DRAWINGS

FIG. 5 is a detailed block diagram of an ignition timing control circuit of FIG. 1.

DESCRIPTION OF THE PREFERRED EMBODIMENTS

One embodiment of this invention will hereinafter be described with reference to the accompanying drawings.

Figure 1:
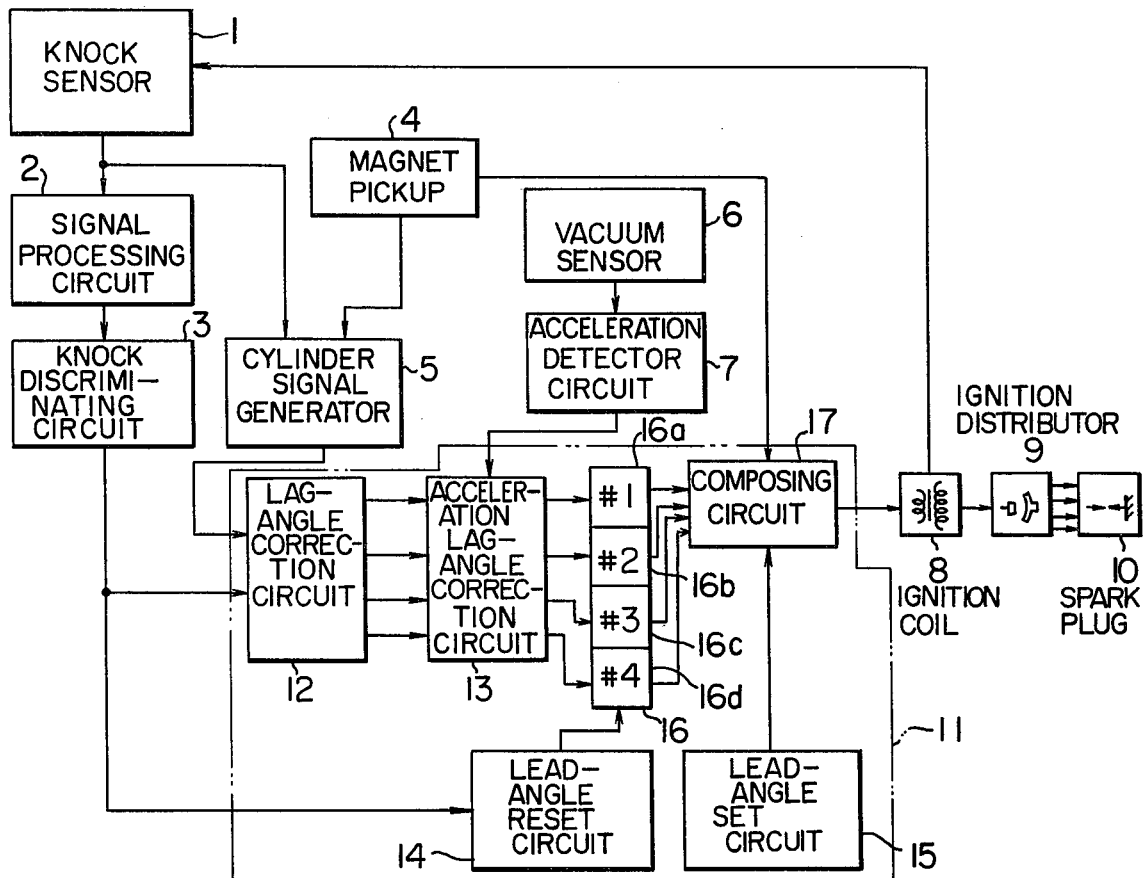
FIG. 1 is a block diagram of an embodiment of the ignition timing control apparatus according to this invention.
Figure 2:
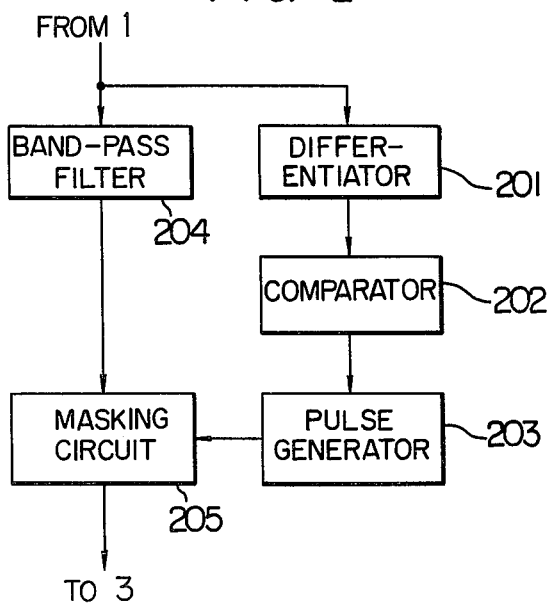
FIG. 2 is a block diagram of a signal processing circuit in FIG. 1.

Referring to FIG. 1, there are shown a knock sensor or a discharge voltage detector 1 for detecting a discharge voltage for an ignition plug, such as a known voltage probe or the like, and a signal processing circuit 2 for detecting a knock fluctuation component of an induction discharge voltage occuring when the engine generates a knock, from the output signal of the knock sensor 1. This signal processing circuit 2, as shown in FIG. 2, comprises a differentiator 201 formed of a capacitor and a resistor, a comparator 202 formed of an operational amplifier and which detects the generation of a higher differentiation output than a preselected level from the differentiator 201, due to the differentiation output being increased when the ignition plug is blown out, a pulse generator 203 for generating a pulse of a constant duration, for example, 0.2 ms in response to the output from the comparator 202, a band-pass filter circuit 204 for producing a signal of a pressure fluctuation frequency, for example, 5 to 10 kHz upon knocking, and a masking circuit 205 for removing a blown-out time component of the output signal from the band-pass filter 204. Each of the elements of the signal processing circuit 2 is formed of the combination of a commercially available IC, operational amplifier, resistors, capacitors and so on, thus the details thereof are not described.

Figure 3:
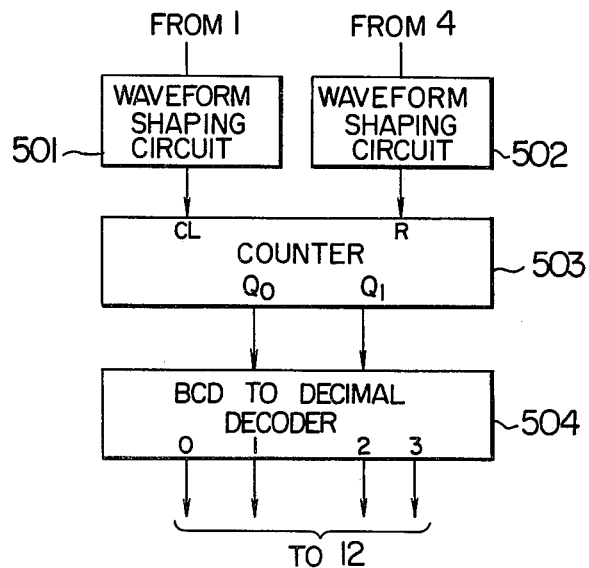
FIG. 3 is a block diagram of a cylinder signal generator in FIG. 1.

The knock detection will be mentioned below. The fluctuation components of the discharge voltage is the resultant of the two fluctuations due to the blowing-out and knocking. The noise, or the fluctuation due to the blowing-out, of the fluctuation components of the discharge voltage is removed by the signal-processing circuit 2. In this signal-processing circuit 2, the output from the differentiator 201 is discriminated in level in the comparator 202 and thereby the presence of noise is detected. At the same time, the pulse generator 203 generates a masking pulse for separating the noise from the differentiator output, in response to the occurrence of noise. On the other hand, the signal from the knock sensor 1 is supplied to the band-pass filter circuit 204, through which a small noise component thereof is erased, and the output of the filter circuit 204 with the small noise component erased is applied to the masking circuit 205, by which the blowing-out noise thereof is removed. Then, only the fluctuation component of discharge voltage corresponding to the pressure variation within the cylinder is supplied from the masking circuit 205 to a knock discriminating circuit 3. This knock discriminating circuit 3 serves to discriminate the presence and absence of a knock on the basis of the output from the signal processing circuit 2, which has a comparator formed of an operational amplifier or the like. In such knock-detecting section as mentioned above, the sensor 1 is supplied with a secondary terminal voltage of an ignition coil or the terminal voltage of a distributor, in order to detect the discharge voltage for each cylinder. The ignition plug carries out discharge twice per cycle so that detection is made of ignition and knock. Also, in FIG. 1, reference 4 represents a known magnetic pickup adapted to produce a TDC signal at each two revolutions of engine, and 5 a cylinder signal generator for discriminating a cylinder under combustion from the others on the basis of the output signal from the magnetic pickup 4 and the ignition signal from the detector 1. This cylinder signal generator 5, as shown in FIG. 3, comprises waveform-shaping circuits 501 and 502, a binary counter 503, and a BCD-to-decimal decoder 504. The binary counter 503, when supplied with a signal from the magnetic pickup 4, starts to count the signal from the detector 1. Therefore, when the magnetic pickup 4 generates a signal at the top dead center of conpression of the first cylinder, the counter 503 is reset to produce signal of "00", which indicates that the first cylinder is under combustion. When the detector 1 supplies its output to the counter 503, the counter 503 produces a signal of "01", which indicates that the third cylinder is under combustion. Similarly, the counter 503 produces "10" and then "11" which indicate that the second cylinder and then fourth cylinder are under combustion. The decoder 504 decodes the output signal from the counter 503 when the first, third, second and fourth cylinders undergo combustion in turn, to produce a 1-level signal at a terminal 0, terminal 1, terminal 2 and then terminal 3, respectively.

Figure 4:
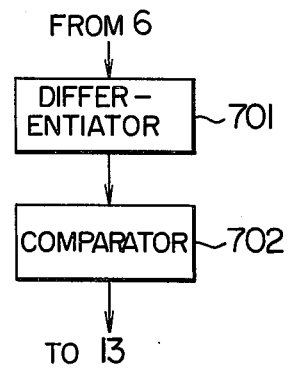
FIG. 4 is a block diagram of an acceleration detector circuit in FIG. 1.

In FIG. 1, reference 6 represents, for example, a known vacuum sensor for detecting the load condition of the engine, and 7 an acceleration detector circuit for detecting a rapid acceleration of the engine larger than a predetermined level on the basis of the change of the output from the vacuum sensor 6. The acceleration detector circuit 7, as shown in FIG. 4, includes a differentiator 701 for differentiating the output of the vacuum sensor 6, and a comparator 702 for comparing the output of the differentiator 701 with the predetermined level. This detector circuit 7 produces an acceleration signal when the sensor output is changed to a value greater than the predetermined value. Reference 8 represents a known ignition coil adapted so that multidischarge is performed at a ignition spark plug as described previously, 9 an ignition distributor, and 10 an ignition spark plug.

Reference 11 represents an ignition timing control circuit for calculating an ignition timing $\theta_i$ for each cylinder and controlling the charge and discharge timing of the ignition coil on the basis of the calculated result. FIG. 5 is a detailed diagram of the ignition lead angle control circuit 11. The calculation of the ignition timing $\theta_i$ is carried out from the following equation (1):

$$\theta_i = \theta_{ig} - \Sigma K_n\{\Delta\theta_1 \times f(K_1)\} + \Sigma R \times \Delta\theta_2 \qquad (1)$$

where, $\theta_{ig}$ is a predetermined reference ignition timing common to all the cylinders, in the normal operating condition without any knock, $K_n$ is a coefficient for lagging the lead angle once at each knock signal (the output signal from the knock discriminating circuit 3) and which takes value 1 upon occurrence of the knock signal, $\Delta\theta_1$ is a reference lag-angle amount that the ignition timing lags for each occurrence of the knock signal, $f(K_1)$ is a lag-angle correcting coefficient which takes value of 1 for a knock cylinder and value of $K_1(0<K_1<1)$ for a non-knock cylinder, R is a coefficient for leading the angle subjected to the lag-angle correction, once when no knock signal is present for a predetermined time, for example, 2 seconds, and takes value of 1 at each lapse of that predetermined time, and $\Delta\theta_2$ is a reference lead angle amount common to all the cylinders, by which the angle subjected to the lag-angle correction leads at each lapse of the predetermined time.

Reference 12 represents a lag-angle correction circuit which receives the output signals from the knock discriminating circuit 3 and cylinder signal generator 5, calculating the lag-angle correction amount for the ignition timing therefrom and supplying a pulse signal indicative of the calculated lag-angle correction amount. In other words, this circuit 12 calculates $\Delta\theta_1 \times f(K_1)$ in Eq. (1) and supplies lag-angle amount of $\Delta\theta_1$ to the knock cylinder and lag-angle amount of $\Delta\theta_1 \times K_1(0<K_1<1$, for example, $\frac{1}{2}$) to the non-knock cylinder. Also, the lag-angle correction circuit 12, as shown in FIG. 5, comprises a pulse generator 121 which is triggered by the knock signal from the knock discriminating circuit 3 to produce one pulse and two pulses at separate terminals, and a gate circuit 122 which is supplied with the cylinder signals from the cylinder signal generator 5 and thereby outputs the pulse from the pulse generator 121. The gate unit 122, when a knock signal is produced, outputs two pulses (for example, corresponding to 1° CA) at the terminal associated with the cylinder under combustion generating a knock and one pulse (for example, corresponding to 0.5° CA) at the other terminals associated with the other non-knock cylinders. Reference 13 represents an acceleration lag-angle correction circuit which, when supplied with the output signals from the lag-angle correction circuit 12 and the acceleration detecting circuit 7, again sets the lag-angle correction coefficient $f(K_1)$ to 1 irrespective of a knock cylinder and a non-knock cylinder and giving the lag-angle amount of $\Delta\theta_1$ for ignition timing for all the cylinders. This circuit 13, as shown in FIG. 5, includes a pulse generator 131 which is triggered by the acceleration signal from the acceleration detector circuit 7 to produce two pulses, and a gate unit 132. The gate unit, at accelerating, outputs two pulses at terminals #1 to #4 associated with respective cylinders and, when the acceleration signal is not generated from the acceleration detecting circuit 7, outputs the pulse directly from the lag-angle correction circuit 12. In other words, when supplied with no signal from the acceleration detector circuit 7, the circuit 13 does not perform the abovementioned setting of the correction coefficient $f(K_1)$.

Reference 14 represents a lead-angle reset circuit for generating a pulse indicative of the abovestated reference ignition timing amount (for example, lead angle of 1° CA) when the knock discriminating circuit 3 produces no signal for a predetermined time, for example 2 seconds. This lead-angle reset circuit 14, as shown in FIG. 5, includes an OR gate 141, a counter 142, a clock circuit 143, and a pulse generator 144. The counter 142 is reset by the knock discriminating circuit 3 or the count end signal from itself and at the same time starts to count the clock pulses from the clock circuit 143. When a predetermined time mentioned above elapses from the generation of a knock signal or the end of the count, the counter 142 supplies a trigger pulse to the pulse generator 144, which then produces two pulses in response to the trigger pulse.

Reference 15 represents a lead-angle set circuit which establishes an ignition timing $\theta_{ig}$ in accordance with the driving condition of the engine under the normal driving condition in which no knock occurs, and which has the same function as does the known electronic ignition timing circuit. Reference 16 designates a correction amount circuit for calculating the whole amount of correction for the ignition timing. This circuit 16 includes arithmetic sections 16a, 16b, 16c and 16d associated with respective cylinders. In FIG. 5, a 4-cylinder engine is assumed, and the arithmetic sections 16a to 16d correspond to the first to fourth cylinders #1 to #4. Each section calculates $$-\Sigma K_n\{\Delta\theta_1 \times f(K_1)\} + \Sigma R \times \Delta\theta_2$$

of Eq. (1) for the corresponding cylinder, provided that in this calculation, $$-\Sigma K_n\{\Delta\theta_1 \times f(K_1)\} + \Sigma R \times \Delta\theta_2 \leq 0$$

and the amount of lead-angle correction by the lead-angle reset circuit 14 is at most enough to cancel the amount of lag-angle correction by the lag-angle correction circuit 12 and acceleration lag-angle correction circuit 13. Therefore, when no lag-angle correction upon knock generation is carried out for the ignition timing, the lead-angle reset circuit 14 performs no lead-angle correction. This correction amount circuit 16 can be formed of up/down (U/D) counters 161 to 164 associated with respective cylinders. Each U/D counter operates to count up or down in accordance with the pulse signals from the acceleration lag-angle correction circuit 13 and lead-angle reset circuit 14.

Reference 17 represents a composing circuit for adding the reference ignition timing value $\theta_{ig}$ produced from the lead-angle set circuit 15 and each of the outputs of the U/D counters 161 to 164 to determine the ignition timing $\theta_i$ for each cylinder and controlling the charge and the discharge timing of the coil 8 in synchronism with the output signal from the cylinder signal generator 5. This composing circuit 17, as shown in FIG. 5, includes a signal selecting circuit 171, an adder 172 and an A/D converter 173. For example, in order to compute the ignition timing for the second cylinder, the output of the U/D counter 162 associated with the second cylinder is selected by the selecting circuit 171 in response to the output signal from the cylinder signal generator 5, and added to or subtracted from the output signal from the lead angle set circuit 15 at the adder 172 which then delivers an ignition timing signal through the A/D converter 173.

Since under the driving condition in which no knock occurs, the knock discriminating circuit 3 generates no knock signal, the lag-angle correction is not performed for the ignition timing and thus the lead-angle correction is not performed by the ignition lead-angle reset circuit 14. Consequently, the ignition timing $\theta_i$ becomes the reference ignition timing value $\theta_{ig}$ established by the lead-angle set circuit 15, and at this ignition timing $\theta_{ig}$, the engine is operated.

When knock occurs at the high-load driving condition, a knock occurs in the engine, the knock sensor 1, the signal processing circuit 2 and the knock discriminating circuit 3 operate in combination to detect the change of the induction discharge voltage at the discharge time during combustion period in which the knock occurred and then produce the knock signal. At the same time, the output of the cylinder signal generator 5 and the output of the knock discriminating circuit 3 are supplied to the lag-angle correction circuit 12, which then operates to generate lag-angle signals of lag-angle amounts $\Delta\theta_1$ and $K_1 \times \Delta\theta_1$ for knock and non-knock cylinders, respectively. If, at this time, the engine is not in a rapidly accelerated condition, the acceleration lag-angle correction circuit 13 does not further correct the above lag-angle amounts but directly supplies the inputs, or the lag-angle signals to the arithmetic sections 16a to 16d of the correction amount circuit 16. Thus, the correction amount arithmetic sections 16a to 16d, composing circuit 17 and lead-angle set circuit 15 operate in combination to calculate lag-angles of $\Delta\theta_1$ and $K_1 \times \Delta\theta_1$ for knock and non-knock cylinders, respectively and determine the ignition timing $\theta_i$ of Eq. (1). If a knock is further detected, lag-angle correction is further performed similarly. In addition, when a knock occurs in the rapidly accelerated condition of the engine, the acceleration detection circuit 7 and acceleration lag-angle correction circuit 13 operate in combination to correct the lag-angle amount produced by the lag-angle correction circuit 12 and to cause the ignition timing of all cylinders to lag by the same amount of $\Delta\theta_1$.

As a result of lag-angle correction for the ignition timing due to knock occurrence, the angle lags more at a cylinder where knock frequently occurs, and thus an ignition lead-angle corresponding to different knock limit is set for each cylinder of the engine. Also, the control of the ignition timing for restriction of knock occurrence is not performed quite separately at each cylinder, but when a knock is detected in one cylinder, the non-knock cylinder is controlled in its ignition timing at the same time under consideration that it is in a condition in which a knock occurs easily, thus knock occurrence being restricted to a great extent.

As soon as the engine, after knock occurrence, is returned to the driving condition in which no knock occurs, the lead-angle reset circuit 14 operates to cause the ignition timing of each cylinder to gradually reach the reference ignition timing value $\theta_{ig}$, and thus the engine is driven at the so-called normal ignition timing.

Figure 6:
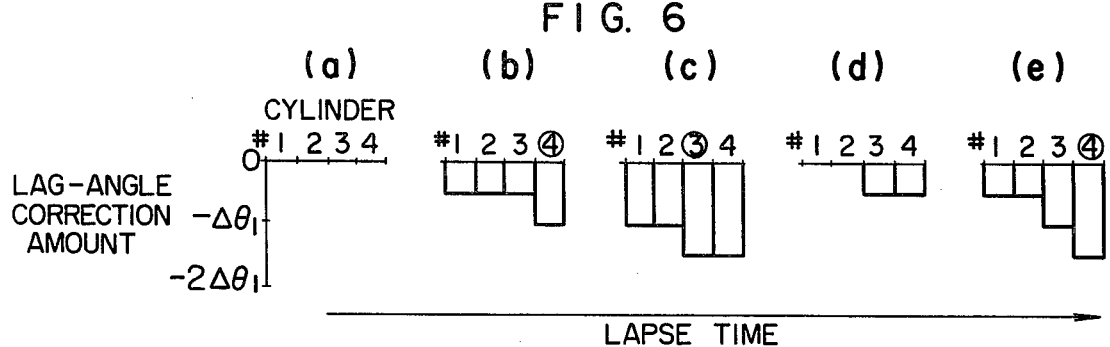
FIG. 6 shows the condition of the ignition timing correction in the embodiment of FIG. 1, with respect to time lapse.

FIG. 6 shows an example of the ignition lead-angle control in case a rapid acceleration is not effected. At (a), (b), (c), (d) and (e) of FIG. 6, there are shown the change of correction amounts for ignition timing with respect to the time lapse. Numbers in FIG. 6 represent the first to fourth cylinders and the circled numbers are cylinders in which a knock is occurred.

The condition of (a) is that in each cylinder no knock occurs, and the ignition is made at the reference ignition timing $\theta_{ig}$, and the condition of (b) is that a knock starts to occur in the fourth cylinder, a lag-angle correction is made by $\Delta\theta_1$ to the fourth cylinder and at the same time a lag-angle correction is made by $K_1 \Delta\theta_1$ (in the figure, $\frac{1}{2} \Delta\theta_1$) to the other cylinders in order to avoid knock occurrence. The condition of (c) is that since knock continuously occurs in the third cylinder, a lag-angle correction is made by $\Delta\theta_1$ to the third cylinder, and by $K_1 \Delta\theta_1$ to the other cylinders, and the condition of (d) is that the knock occurrence is stopped and lead-angle correction is made by $\Delta\theta_2$ (in the figure, $\Delta\theta_2 = \Delta\theta_1$). The condition of (e) is that the lag-angle correction is made in a greater amount to cylinders in which a knock occurs easily, than that to the other cylinders, and each cylinder is set to an ignition timing at which a larger output is obtained, in the vicinity of knock limit.

While in the above embodiment, the acceleration detector circuit 7 detects a rapid acceleration to produce output, in the engine having a large response delay of fuel within the suction tube upon acceleration there may be provided a timer circuit for holding the output of the acceleration detector circuit 7 for a set time, for example, 5 seconds corresponding to the time required for a transient change of air-fuel ratio before producing the output to the acceleration lead-angle correction circuit 13. It is needless to say that as a sensor for acceleration detection, it is possible to use for example, a known air-flow sensor, throttle position sensor, acceleration increasing signal for electronic fuel injection, or the like. Also, the knock detection can naturally be made by a conventional method in which the pressure within each cylinder is measured by a pressure gauge.

While in this embodiment, for sensing a knock, a change of the induction discharge voltage for each cylinder is detected, other methods can be used as long as it is possible to discriminate knocks for each cylinder. For example, conventional vibration type knock sensors are used at a plurality of places of the cylinder block in order to give uniform precision of knock detection at each cylinder, thereby knock occurrence in each cylinder being detected equivalently. In the engine having a small number of cylinders, if a single vibration sensor is able to detect knock occurrence similarly as described above, cylinder discrimination can still similarly be performed naturally.

While in the above embodiment, when no knock signal is generated for a predetermined time, for example, 2 seconds, the lead-angle reset circuit 14 makes the lead-angle correction of the same amount, $\Delta\theta_2$ for all cylinders, it is possible to make a lead-angle correction so that the lead-angle correction for the cylinder in which a knock occurred (requiring a lag-angle correction by the lag-angle correction circuit 12) is made by $K_2 \times \Delta\theta_2$ ($0 < K_2 < 1$, for example, $K_2 = \frac{1}{2}$) and the lead-angle corrections for the other cylinders are made by $\Delta\theta_2$.

Figure 7:
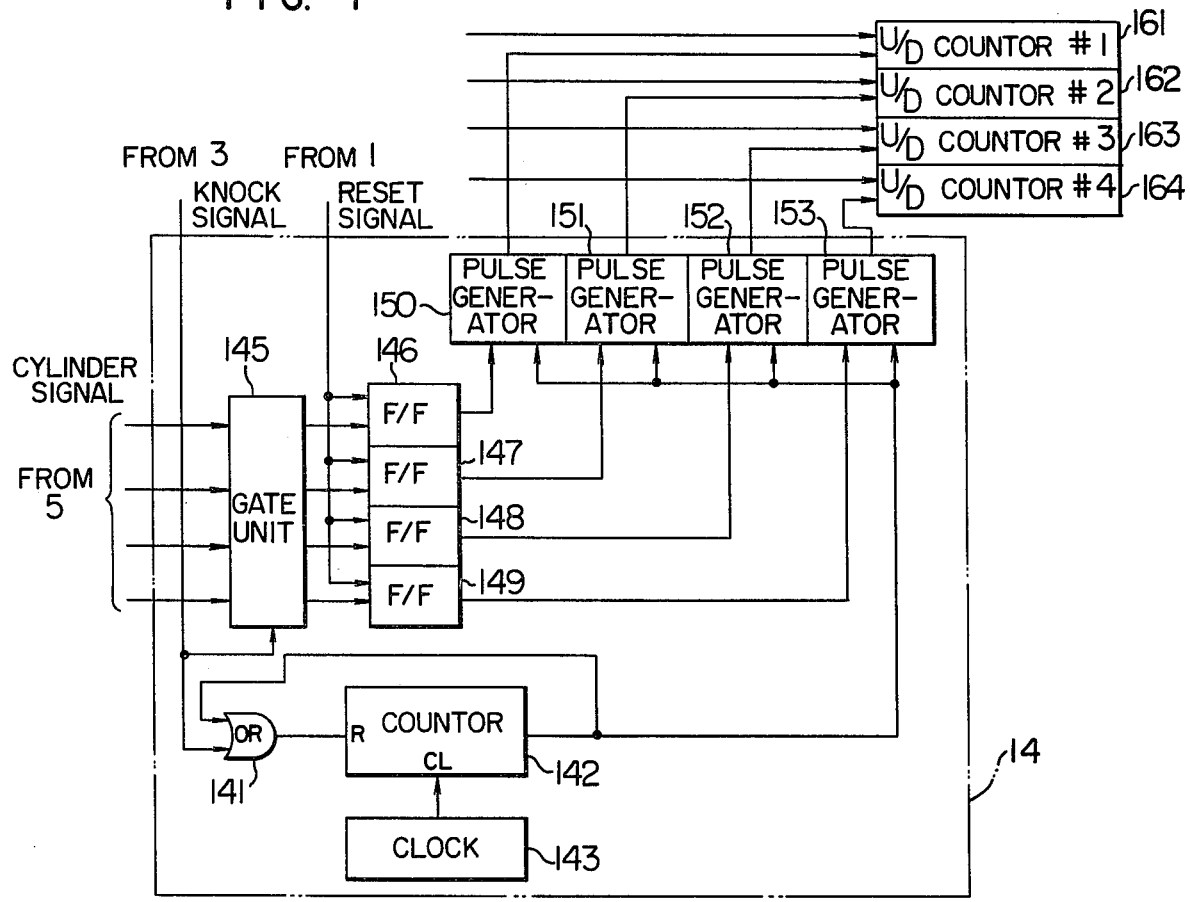
FIG. 7 is a block diagram of a lead-angle reset circuit in the ignition timing control apparatus of another embodiment of this invention.

Such a lead-angle correction can be realized by the arrangement of the lead-angle reset circuit 14 as shown in FIG. 7.

In FIG. 7, an OR gate 141, a counter 142, and a clock circuit 145 are the same as those of FIG. 5. The gate unit 145 is supplied with a cylinder signal from the cylinder signal generator 5 and a knock signal from the knock discrimination circuit 3 to produce AND output, or generate 1-level signal at the terminal associated with the knock cylinder. This 1-level signal sets the corresponding one of flip flop 146 to 149 to store the knock cylinder. The flip-flops 146 to 149, when set, produce 1-level signal. Also, these flip-flops 146 to 149 are reset by the signal from the discharge voltage detector 1 to produce 0-level signal. Pulse generators 150 to 153 are supplied with a trigger signal from the counter 142 under the condition in which 0-level signal is applied from the corresponding flip-flops, to produce two pulses. On the other hand, when the trigger signal is applied thereto under the condition in which 1-level signal is supplied thereto, the corresponding pulse generator thereof produces a signal pulse. Thus, the cylinder in which a knock has occurred can be caused to lead by, for example, 0.5 CA, and the other cylinders be caused to lead by 1° CA.

Figure 8:
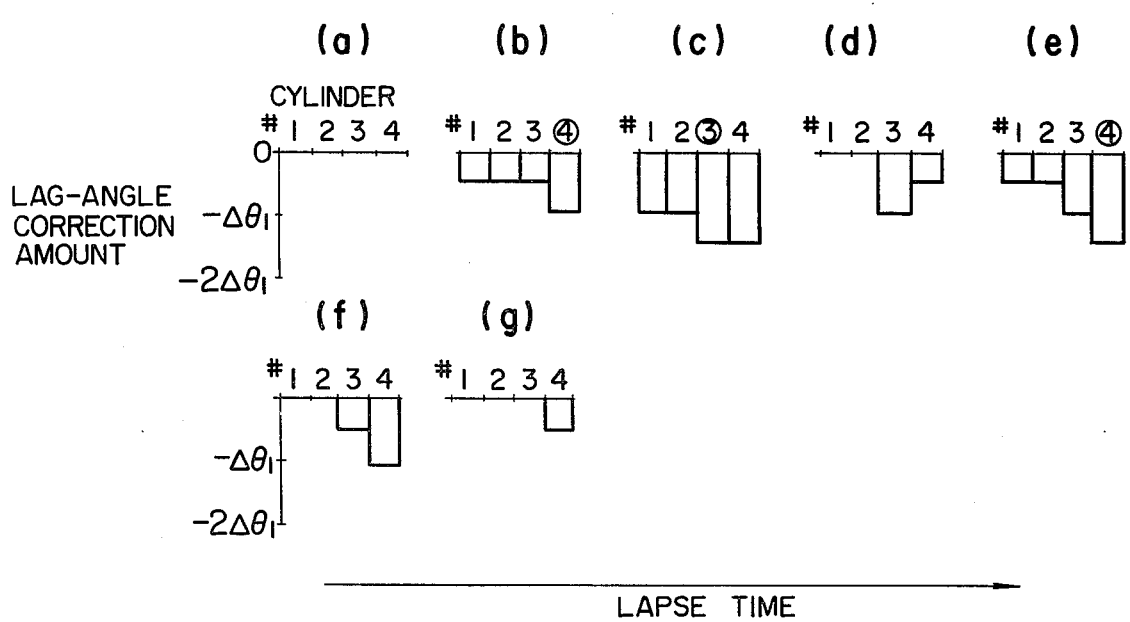
FIG. 8 shows the condition of the ignition timing correction in the second embodiment, similar to the diagram of FIG. 6.

FIG. 8 shows an example of the ignition timing control for such lead-angle correction, which example is similar to that of FIG. 6. In FIG. 8, (a), (b) and (c) respectively indicate that no knock occurs and in each cylinder, ignition is made at the reference ignition timing $\theta_{ig}$, that a lag-angle correction is made by the knock occurring in the fourth cylinder, and that a lag-angle correction is made by the knock occurring in the third cylinder. The condition (d) is that the knock occurrence is stopped, and a lead-angle correction is made by $K_2 \Delta\theta_2$ (in the figure, $K_2 \Delta\theta_2 = \frac{1}{2}\Delta\theta_1$) to the third cylinder in which knock has occurred in (c), and by $\Delta\theta_2$ (in the figure, $\Delta\theta_2 = \Delta\theta_1$) to the other cylinders. The condition (e) is that a lag-angle correction is made by $\Delta\theta_1$ to the fourth cylinder in which a knock occurs, and by $K_1 \Delta\theta_1$ to the other cylinders. The condition (f) is that the knock occurrence is stopped, and a lead-angle correction is made by $K_2 \Delta\theta_2$ to the fourth cylinder in which knock has occurred in (e), and by $\Delta\theta_2$ to the other cylinders. The condition (g) is that since no knock further occurs, a lead-angle correction is made by $\Delta\theta_2$ to all cylinders.

We claim:

1. An ignition timing control apparatus for a multi-cylinder engine comprising:
   a setting device for setting a predetermined reference ignition timing common to all cylinders under a normal driving condition in which no knock occurs;
   a knock sensor for producing an output signal when a knock occurs at least in one of said cylinders;
   a cylinder discriminating device for discriminating a cylinder under combustion;
   an ignition lead-angle correction device for calculating an ignition lead-angle correction amount in response to output signals from said knock sensor and said cylinder discriminating device such that each time said knock sensor generates an output signal, said ignition lead-angle correction device generates a signal for making a lag-angle correction by a certain amount of $\Delta\theta_1$ to an ignition timing of a knock-occuring cylinder and making a lag-angle correction by $K_1 \times \Delta\theta_1$ ($K_1$ is a constant correction coefficient, and $0 < K_1 < 1$) to the ignition timing of the other cylinders; and
   an ignition timing device for calculating an ignition timing of each cylinder in response to output signals from at least said setting device and said ignition lead angle correction device and controlling a discharge timing of the ignition coil of each cylinder in response to the result of calculation.

2. An apparatus according to claim 1, further comprising:

an acceleration detecting device for detecting a rapid-acceleration driving of the engine higher than a constant acceleration; and a correction coefficient modifying device for modifying said correction coefficient $K_1$ to 1 in response to an output signal from said acceleration detecting device.

3. An apparatus according to claim 1 or 2, further comprising a lead-angle resetting device which responds to the fact that said knock sensor does not generate an output signal for a predetermined time, to generate a signal for making a lead-angle correction by a predetermined amount to said ignition timing of each cylinder for which lag-angle correction is made, at intervals of said predetermined time in order to cancel at most the lag-angle amount, said ignition timing device calculating an ignition timing of each cylinder in response to output signals from said setting device and said ignition lead-angle correction device and an output signal from said lead-angle resetting device.

4. An apparatus according to claim 3, wherein said lead-angle resetting device has means for generating a signal for making lead-angle correction by the same amount of $\Delta\theta_2$ to the ignition timing of all cylinders at intervals of said predetermined time.

5. An apparatus according to claim 3, wherein said lead-angle resetting device has means for generating a signal for making lead-angle correction by $\Delta\theta_2$ to the ignition timing of the cylinders other than said knock-generating cylinder at intervals of said predetermined time, and a signal for making lead-angle correction by $K_2 \times \Delta\theta_2$ ($K_2$ is a constant correction coefficient, and $0 < K_2 < 1$) to the ignition timing of said knock-generating cylinder.

* * * * *